(12) United States Patent
Knobel

(10) Patent No.: US 9,173,418 B2
(45) Date of Patent: Nov. 3, 2015

(54) METHOD AND DEVICE FOR PRODUCING CONFECTIONARY PRODUCTS

(75) Inventor: Guido Knobel, Felben (CH)

(73) Assignee: KMB PRODUKTIONS AG, Felben (CH)

( * ) Notice: Subject to any disclaimer, the term of this patent is extended or adjusted under 35 U.S.C. 154(b) by 824 days.

(21) Appl. No.: 10/519,292

(22) PCT Filed: May 8, 2003

(86) PCT No.: PCT/EP03/04812
§ 371 (c)(1),
(2), (4) Date: Dec. 23, 2004

(87) PCT Pub. No.: WO03/099031
PCT Pub. Date: Dec. 4, 2003

(65) Prior Publication Data
US 2006/0057265 A1    Mar. 16, 2006

(30) Foreign Application Priority Data

May 27, 2002 (DE) .................................. 102 23 568
Nov. 11, 2002 (DE) .................................. 102 52 633

(51) Int. Cl.
*A23G 3/02* (2006.01)
*A23G 3/20* (2006.01)
*A23G 1/20* (2006.01)
*A23G 1/21* (2006.01)

(52) U.S. Cl.
CPC .............. *A23G 3/2023* (2013.01); *A23G 1/205* (2013.01); *A23G 1/21* (2013.01); *A23G 3/0252* (2013.01); *A23G 3/0263* (2013.01)

(58) Field of Classification Search
CPC ... A23G 3/2023; A23G 3/0252; A23G 1/205; A23G 3/0263; A23G 1/21
USPC ......... 425/547, 398, 262, 408, 410, 414, 416, 425/422, 443, 407, 412, 417, 405.1, 193, 425/195, 353, 389, 394, 403, 406, 425/467–469; 426/512, 514, 515, 660, 138, 426/139, 279, 280, 524; 249/79; 99/349, 99/455, 458, 516, 517
See application file for complete search history.

(56) References Cited

U.S. PATENT DOCUMENTS

| 1,637,532 | A | * | 8/1927 | Oliver et al. | .................. 162/220 |
| 2,363,107 | A | * | 7/1941 | Young | ............................ 425/444 |

(Continued)

FOREIGN PATENT DOCUMENTS

| EP | 914774 A1 | * | 5/1999 | ............... A23G 1/20 |
| EP | 920810 A1 | * | 6/1999 | ............... A23G 1/20 |

(Continued)

OTHER PUBLICATIONS

Translation of WO 98/52425.*

(Continued)

*Primary Examiner* — Yogendra Gupta
*Assistant Examiner* — Emmanuel S Luk
(74) *Attorney, Agent, or Firm* — Bachman & LaPointe, P.C.

(57) ABSTRACT

A method for producing confectionary products having an outer shell made of a substance that is placed inside a mold into which a temperature-controlled male die is subsequently introduced. The substance is placed under pressure after the male die is introduced.

5 Claims, 3 Drawing Sheets

(56) References Cited

U.S. PATENT DOCUMENTS

| | | | | |
|---|---|---|---|---|
| 2,625,120 A * | 1/1953 | Eddy et al. | | 425/165 |
| 2,848,743 A * | 8/1958 | Mercier | | 264/325 |
| 2,856,667 A * | 10/1958 | Gorsuch | | 425/95 |
| 3,013,306 A * | 11/1960 | Richie et al. | | 425/318 |
| 2,981,976 A * | 5/1961 | Maier | | 425/417 |
| 3,045,284 A * | 7/1962 | Peras | | 425/128 |
| 3,171,731 A * | 3/1965 | Perry et al. | | 65/162 |
| 3,261,055 A * | 7/1966 | Dart | | 425/86 |
| 3,497,173 A * | 2/1970 | Valyi | | 249/79 |
| 3,587,132 A * | 6/1971 | Czteli | | 425/407 |
| 3,642,415 A * | 2/1972 | Johnson | | 425/389 |
| 3,692,456 A * | 9/1972 | Foster | | 425/412 |
| 4,057,874 A * | 11/1977 | Walker, Jr. | | 425/318 |
| 4,076,207 A * | 2/1978 | Austin | | 249/66.1 |
| 4,091,069 A * | 5/1978 | Allen | | 264/328.16 |
| 4,758,394 A * | 7/1988 | Yaita et al. | | 264/51 |
| 4,873,044 A * | 10/1989 | Epel | | 264/257 |
| 5,102,672 A * | 4/1992 | Vos | | 426/94 |
| 5,188,787 A * | 2/1993 | King et al. | | 264/153 |
| 5,246,721 A * | 9/1993 | Kerkonian | | 426/279 |
| 5,409,722 A * | 4/1995 | Binley | | 426/515 |
| 5,470,581 A * | 11/1995 | Grillo et al. | | 424/479 |
| 5,558,895 A * | 9/1996 | Boyhan | | 426/515 |
| 5,635,230 A * | 6/1997 | Aasted | | 426/138 |
| 5,705,217 A * | 1/1998 | Aasted | | 426/512 |
| 5,753,292 A * | 5/1998 | Haas | | 426/523 |
| 5,783,126 A * | 7/1998 | Andersen et al. | | 264/102 |
| 6,326,041 B1 * | 12/2001 | Truscello | | 426/279 |
| 6,497,568 B1 * | 12/2002 | Aasted | | 425/547 |
| 6,508,642 B1 * | 1/2003 | Aasted | | 425/410 |
| 6,537,483 B1 * | 3/2003 | Cartwright et al. | | 264/511 |
| 6,641,386 B2 * | 11/2003 | Aasted | | 425/547 |
| 6,644,955 B2 * | 11/2003 | Aasted | | 425/547 |
| 6,843,168 B2 * | 1/2005 | Refer | | 99/353 |
| 6,863,521 B2 * | 3/2005 | Petrou | | 425/577 |
| 2003/0232113 A1 * | 12/2003 | Refer | | 426/306 |
| 2005/0175737 A1 * | 8/2005 | Knobel | | 426/89 |

FOREIGN PATENT DOCUMENTS

| | | | | |
|---|---|---|---|---|
| EP | 945069 A2 * | 9/1999 | | A23G 1/20 |
| JP | 05168452 A * | 7/1993 | | A23P 1/10 |
| WO | WO 9500043 A1 * | 1/1995 | | A23P 1/10 |
| WO | WO 9532633 A1 * | 12/1995 | | A23G 1/21 |
| WO | WO 9749296 A1 * | 12/1997 | | A23G 1/21 |
| WO | WO 98/52425 | * 11/1998 | | A23G 1/21 |
| WO | WO 9852425 A1 * | 11/1998 | | A23G 1/21 |
| WO | WO 03094626 A1 * | 11/2003 | | A23G 1/21 |

OTHER PUBLICATIONS

Translation of JP 05-168452.*
NPL: Edible food cup to replace styrofoam cup for food and beverages; published on 2004, p. 1-2.*
Edible food container, p. 1.*

* cited by examiner

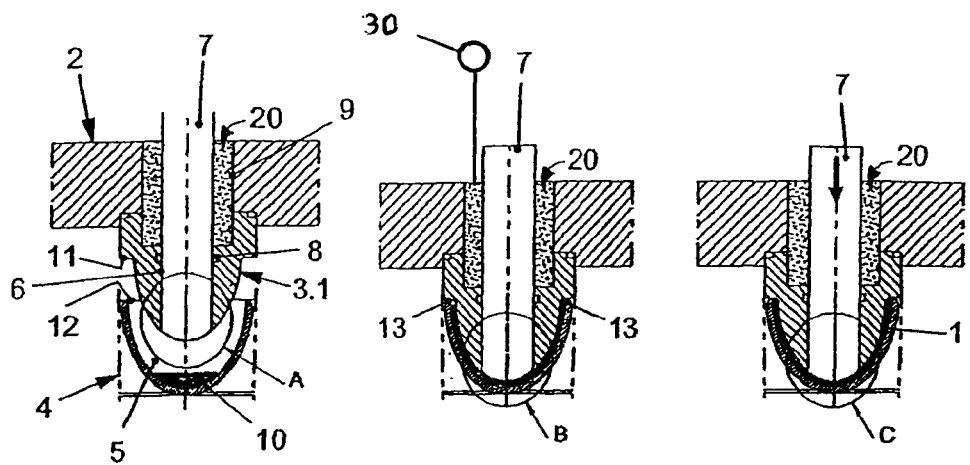
Fig. 1.1         Fig. 1.2         Fig. 1.3
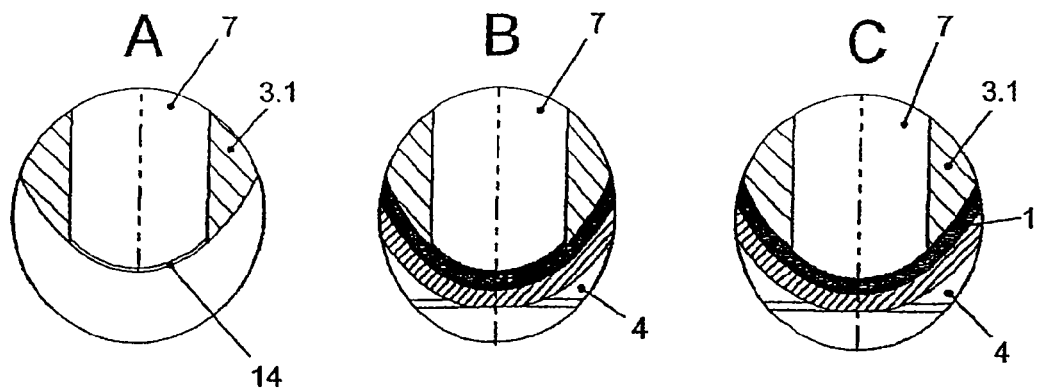
Fig. 2.1         Fig. 2.2         Fig. 2.3

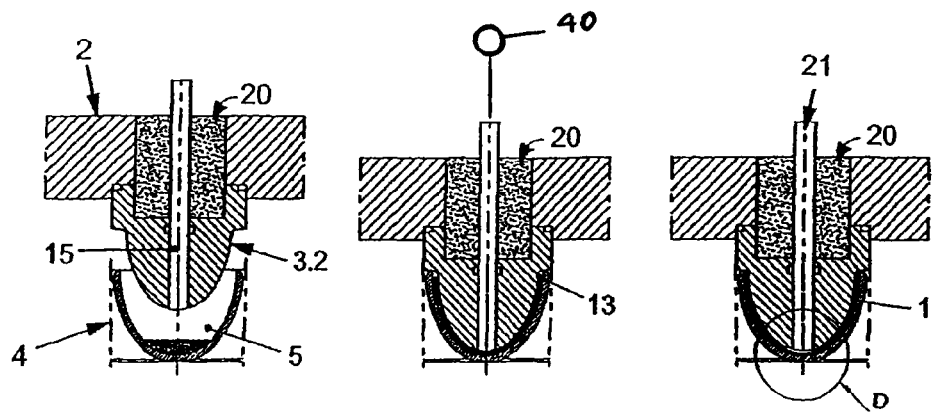
Fig. 3.1  Fig. 3.2  Fig. 3.3
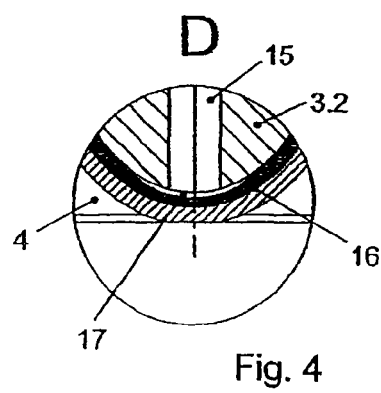
Fig. 4
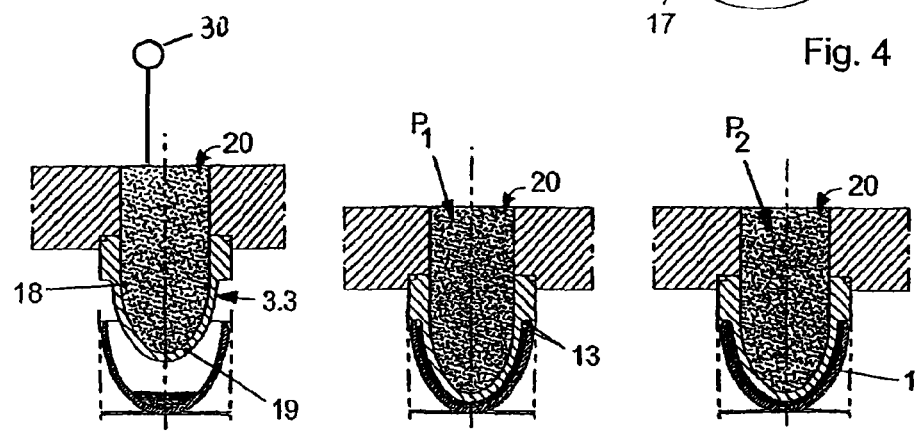
Fig. 5.1  Fig. 5.2  Fig. 5.3

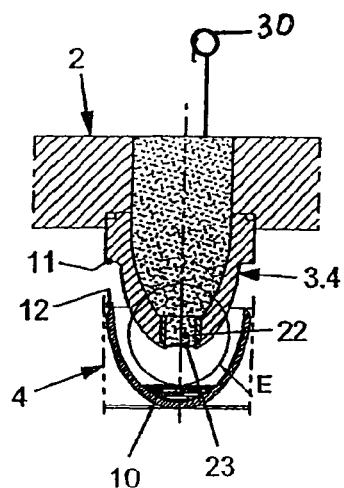
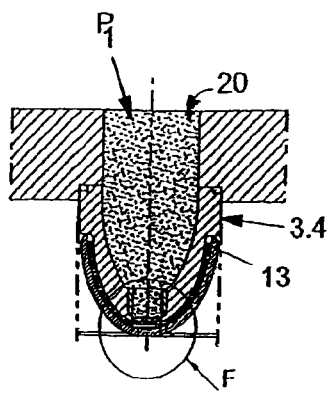
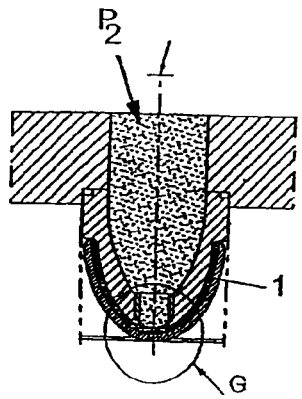
Fig. 6.1   Fig. 6.2   Fig. 6.3
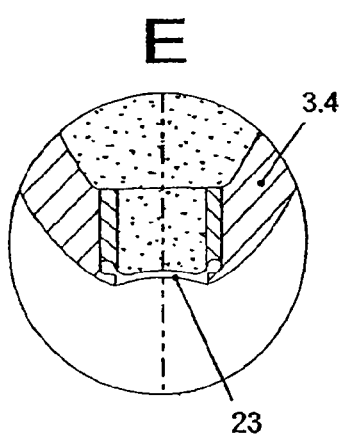
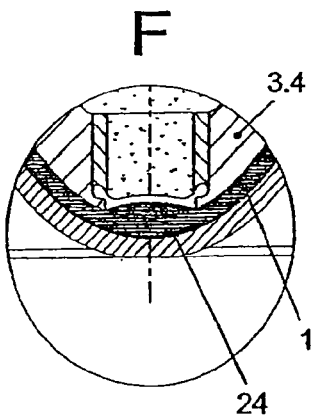
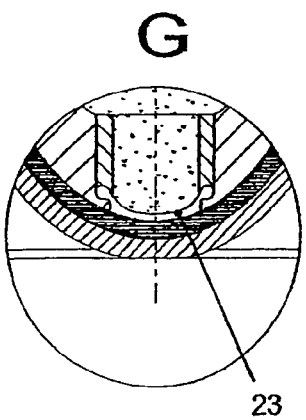
Fig. 7.1   Fig. 7.2   Fig. 7.3

METHOD AND DEVICE FOR PRODUCING CONFECTIONARY PRODUCTS

BACKGROUND of THE INVENTION

The invention relates to a process for producing consumable products having an outer shell made from a substance which is introduced into a mold, into which a temperature-controlled ram then moves, as well as a corresponding apparatus.

DE 197 20 844 C1, by way of example, describes a process and an apparatus for producing consumable products having an outer shell which is produced in extruded form by a temperature-controlled ram moving into a mould, with the dew point of the atmosphere surrounding the consumable product being kept below the temperature of the ram.

It is not possible in this process to determine the mass of chocolate with sufficient accuracy for the edge of the confectionary product to end flush with the edge of the mould. To form a smooth, planar edge, in many cases more chocolate substance than necessary is introduced into a mould cavity. This extra chocolate then emerges over the edge of the mould and has to be removed either using a blade or in some other way. This is a laborious operation and requires an additional working step.

The object of the present invention is to provide a process and an apparatus of the type described above which guarantee the elimination of inclusions of air from the mould cavity.

SUMMARY OF THE INVENTION

The foregoing object is achieved by the present invention wherein the substance is placed under pressure after the ram has moved in.

This means that after the ram has moved in inclusions of air are forced out or spaces which have not hitherto been filled by the chocolate substance are filled.

In an exemplary embodiment, a displacement ram which is guided in an axial bore in the actual shaping ram is used. After the shaping ram has been lowered into the mould space, this displacement ram is placed under a slight pressure, so that it emerges from the shaping ram and presses the chocolate substance in such a way that spaces which have not yet been filled are filled.

In a preferred exemplary embodiment, it is provided that the displacement ram is retracted slightly into its bore in the shaping ram during the movement into the chocolate substance, so as to form an additional space for chocolate substance. After it has been lowered, the displacement ram is guided in such a way that the chocolate substance located in the additional space is forced out. Ultimately, the end face of the displacement ram lies in the same plane as the shaping ram. This prevents, for example, the base of a shell from being slightly thinner than the side walls.

In a further exemplary embodiment of the invention, consideration is given to connecting a bore in the shaping ram to a pressure source. An example of a suitable pressure source is gas, but other pressure media are also conceivable.

If the shaping ram is then lowered into the mould space, the chocolate substance is displaced. To ensure that chocolate substance does not simply penetrate into the bore with the pressure medium, this bore is filled with pressure medium under a predetermined pressure.

At the end of the molding operation, the pressure is increased, so that the chocolate substance in front of the opening of the bore is placed under pressure by the pressure medium and cavities can be filled.

In a further exemplary embodiment of the invention, the shaping part of the shaping ram is made from an elastic material. Suitable materials for this purpose include all conceivable elastic materials, which may also include relatively thick, metallic foils which can stretch to a certain extent. Of course, consideration may be given in particular to plastic.

The interior of the ram and in particular the elastic part of the ram is filled with a pressure medium which is under a predetermined pressure, so that the elastic part adopts the desired internal shape of the shell. The pressure medium used is preferably cooling liquid.

After the ram has been lowered into the mould space, the pressure on the cooling medium is then increased, so that the elastic part of the shaping ram expands to a certain extent. As a result, a pressure is exerted on the chocolate substance, so that the last free cavities in the mould space are filled.

Consideration may also be given to making only part of the shaping ram elastic. For this purpose, the inherently rigid shaping ram part has an opening which is closed off by an elastic diaphragm. A pressure medium once again applies a preset pressure to the diaphragm, such that the diaphragm does not stretch. It is preferable for the diaphragm to be curved inward. The pressure medium used in this case too is preferably cooling liquid.

After the shaping ram has been lowered, the pressure on the cooling liquid is then increased, so that the diaphragm is expanded or preferably made to curve outward, with the result that chocolate substance located in front of the diaphragm is displaced and inclusions of air are closed up.

BRIEF DESCRIPTION OF THE DRAWINGS

Further advantages, features and details of the invention will emerge from the following description of preferred exemplary embodiments and with reference to the drawing, in which:

FIGS. 1.1 to 1.3 show partial cross sections through an apparatus according to the invention for the production of chocolate shells;

FIGS. 2.1 to 2.3 show enlarged excerpts from FIGS. 1.1 to 1.3 in regions A, B and C;

FIGS. 3.1 to 3.3 show partial cross sections through a further exemplary embodiment of an apparatus according to the invention for the production of chocolate shells;

FIG. 4 shows an enlarged excerpt from FIG. 2.3 in region D;

FIGS. 5.1 to 5.3 show partial cross sections through a further exemplary embodiment of an apparatus according to the invention for the production of chocolate shells in various positions of use;

FIGS. 6.1 to 6.3 show partial cross sections through a further exemplary embodiment of an apparatus according to the invention for the production of chocolate shells in various positions of use;

FIGS. 7.1 to 7.3 show enlarged excerpts from FIGS. 6.1 to 6.3 in regions E, F and G.

DETAILED DESCRIPTION

FIGS. 1.1 to 1.3, 3.1 to 3.3, 5.1 to 5.3 and 6.1 to 6.3 show a mould plate 2, at which there is a ram 3.1, of an apparatus for producing chocolate shells 1. Opposite the ram 3.1 there is a mould 4 in which a mould cavity 5 is formed.

An axial bore 6 in which a displacement ram 7 is guided passes through the ram 3.1. The displacement ram 7 is sealed off with respect to the ram 3.1 by an O ring 8. Furthermore, an annular space 9, in which cooling water 20 from a source 30 is guided, is provided around the displacement ram 7.

The present invention in accordance with FIGS. 1.1 to 1.3 functions as follows:

In accordance with FIG. 1.1, a chocolate substance 10 is located in the mould space 5. The cooled ram 3.1, which is arranged at the mould plate 2, is lowered with the latter and together with the mould space 5 forms a space in which the chocolate shell 1 is at least partially formed, in accordance with FIG. 1.2. A shoulder 11 of the ram 3.1 bears against an annular edge 12 of the mould 4.

It is preferable for slightly less chocolate substance 10 to be introduced into the mould space 5, so that air inclusions 13 result when forming the space for the chocolate shell 1 in accordance with FIG. 1.2. To then expel these air inclusions, the displacement ram 7 is lowered, as shown in FIG. 1.3. It moves into the chocolate substance and displaces the latter in such a way as to expel the inclusions of air.

An improved option as shown in FIGS. 2.1 to 2.3 provides for the displacement ram 7 to be slightly retracted when the ram 3.1 is moving into the chocolate substance 5, so as to form a vertex space 14 in which chocolate substance can collect. When the displacement ram 7 is lowered, it is moved into the plane of the ram 3.1, so that the chocolate substance is forced out of the vertex space 14. This amount of chocolate is sufficient to expel the inclusions of air.

A second possible form of the present invention is illustrated in FIGS. 3.1 to 3.3. In this case, a ram 3.2 passes through a bore 15 or a corresponding tube which is in communication with a gas connection or source 40. After the ram 3.2 has been lowered into the mould space 5 as shown in FIG. 3.2, gas 21 is supplied through the tube 15, so that a certain amount of chocolate substance is displaced in front of the vertex 16 of the ram 3.2, so as to form a free space 17. This is illustrated in FIG. 4.

In a third option as shown in FIGS. 5.1 to 5.3, there is provision for a ram 3.3 to be designed in the form of a shell, with an interior space 18 surrounded by a shell-shaped sheath 19. This sheath 19 is flexible to a certain extent.

When the ram 3.3 is lowered as shown in FIG. 5.2, cooling water 20 from a source 30 which is under a defined pressure $p_1$ is applied to the interior space 18. After the ram 3.3 has molded the shell 1 as far as possible, the pressure of the cooling water is increased to a pressure $p_2$, with the result that the elastic sheath 19 is expanded to a certain extent. The inclusions of air are expelled as a result.

In a fourth option as shown in FIGS. 6.1 to 6.3, the ram 3.4 is in the shape of a shell but is to a large extent produced from a rigid material. Cooling water 20 is guided in its interior.

In the vertex region, the ram 3.4 has an opening 22 which is covered by a diaphragm 23. As can be seen in particular from FIG. 7.1, the diaphragm 23 curves inward.

In accordance with FIG. 6.2, the ram 3.4 is lowered into the chocolate substance 10 so as to form the shell together with air inclusions 13. During this process step, the pressure $p_1$ on the cooling water 20 is maintained.

For this reason, the diaphragm 23 remains in the inwardly curved form which can be seen from FIG. 7.2. As a result, an additional pocket of chocolate 24 is formed toward the shell 1.

Then, as shown in FIG. 6.3, the pressure on the cooling water is increased to a pressure $p_2$, so that the diaphragm 23 curves outward, as can be seen from FIG. 7.3. In the process, the diaphragm 23 forces the chocolate out of the chocolate pocket 24, so that inclusions of air 13 can be eliminated.

The invention claimed is:

1. An apparatus for producing consumable products having an outer shell comprising:
    a mold containing a consumable chocolate material;
    a water-cooled ram having a vertex region and an axial bore communicating with the vertex region;
    the water-cooled ram is configured to selectively move into and out of the mold between a first position and a second position for at least partially forming an outer shell from the consumable chocolate material;
    a source of gas connected to a tube and the tube is connected to the axial bore; and
    the gas from the source communicates through the tube to the axial bore and into the mold for displacing an amount of consumable chocolate material when the water-cooled ram is in the second position.

2. The apparatus as claimed in claim 1, wherein the water-cooled ram has an opening in the vertex region which is covered by a diaphragm.

3. An apparatus for producing consumable products having an outer shell comprising:
    a mold containing an edible consumable material;
    a water-cooled shaping ram having an axial bore terminating at a vertex end, the water-cooled shaping ram being movable into and out of the mold between a first position and a second position wherein movement of the water-cooled shaping ram from the first position to the second position contacts the vertex end with the edible consumable material to at least partially shape an outer shell from the edible consumable material in the mold; and
    a displacement ram within the axial bore of the water-cooled ram, the displacement ram has a terminal end, the displacement ram being movable in the axial bore of the water-cooled shaping ram when the water-cooled shaping ram is in the second position to move the end of the displacement ram to an operational position wherein the terminal end of the displacement ram expels air inclusions in the edible consumable material when the water-cooled shaping ram is in the second position.

4. An apparatus for producing consumable products having an outer shell comprising:
    a mold containing an edible consumable material;
    a water-cooled ram having a vertex region and comprising an internal space and a shell of rigid material surrounding the internal space, the shell is provided with a passage at the vertex region which communicates the internal space with the mold when the water-cooled ram is located in the mold, said passage is covered by a diaphragm;
    the water-cooled ram is configured to selectively move into and out of the mold between a first position and a second position for at least partially forming an outer shell from the edible consumable material;
    a source of cooling water under pressure; and
    the cooling water under pressure communicates with the internal space of the water-cooled ram for moving the diaphragm between a first operational position wherein the diaphragm is inwardly curved with respect to the vertex region to a second operational position wherein the diaphragm curves outwardly for expanding the diaphragm at the vertex region of the water-cooled ram into the mold for displacing an amount of edible consumable material when the water-cooled ram is in the second position.

5. An apparatus for producing consumable products having an outer shell comprising:
    a mold containing an edible consumable material;
    a water-cooled shaping ram having an axial bore terminating at a vertex end, the water-cooled shaping ram being movable into and out of the mold between a first position and a second position wherein movement of the water-cooled shaping ram from the first position to the second position contacts the vertex end with the edible consumable material to at least partially shape an outer shell from the edible consumable material in the mold; and a displacement ram within the axial bore of the water-cooled ram, the displacement ram has a terminal end, the displacement ram being movable within the axial bore of the water-cooled shaping ram when the water-cooled shaping ram is in the second position for moving the terminal end of the displacement ram from a first position wherein the displacement ram is retracted in the axial bore so as to form a vertex space containing the edible consumable material to an operational position wherein the terminal end of the displacement ram is moved to the vertex end of the water-cooled shaping ram for expelling air inclusions in the edible consumable material when the water-cooled shaping ram is in the second position.

\* \* \* \* \*